US012729036B2

(12) United States Patent
D'Ortenzio et al.

(10) Patent No.: US 12,729,036 B2
(45) Date of Patent: Sep. 8, 2026

(54) FOLDING CARTON AND FOLDING CARTON BLANK FOR PACKAGING COSMETIC COMPOSITIONS

(71) Applicant: Wella Germany GmbH, Darmstadt (DE)

(72) Inventors: Eleonora D'Ortenzio, Darmstadt (DE); Dena Muniz, Darmstadt (DE); Gregor Groener, Darmstadt (DE); Gitta Watson, Darmstadt (DE)

(73) Assignee: Wella Germany GmbH, Darmstadt (DE)

( * ) Notice: Subject to any disclaimer, the term of this patent is extended or adjusted under 35 U.S.C. 154(b) by 81 days.

(21) Appl. No.: 18/758,107

(22) Filed: Jun. 28, 2024

(65) Prior Publication Data

US 2025/0002203 A1 Jan. 2, 2025

(30) Foreign Application Priority Data

Jun. 28, 2023 (EP) .................................... 23182072

(51) Int. Cl.

| | |
|---|---|
| ***B65D 5/02*** | (2006.01) |
| ***B31B 50/26*** | (2017.01) |
| ***B31B 50/62*** | (2017.01) |
| ***B31B 50/88*** | (2017.01) |
| ***B31B 100/00*** | (2017.01) |
| ***B31B 110/35*** | (2017.01) |
| ***B31B 120/30*** | (2017.01) |
| ***B32B 29/00*** | (2006.01) |
| ***B65D 5/42*** | (2006.01) |
| ***B65D 5/56*** | (2006.01) |

(52) U.S. Cl.

CPC .......... *B65D 5/0227* (2013.01); *B31B 50/262* (2017.08); *B31B 50/624* (2017.08); *B31B 50/88* (2017.08); *B32B 29/005* (2013.01); *B65D 5/4216* (2013.01); *B65D 5/4266* (2013.01); *B65D 5/563* (2013.01); *B31B 2100/00* (2017.08); *B31B 2110/35* (2017.08); *B31B 2120/302* (2017.08); *B32B 2255/12* (2013.01); *B32B 2255/28* (2013.01); *B32B 2307/7376* (2023.05); *B32B 2439/62* (2013.01)

(58) Field of Classification Search

CPC .. B65D 5/0227; B65D 5/4216; B65D 5/4266; B65D 5/563; B65D 5/542; B65D 5/0254
USPC ........................................ 206/459.5; 229/100
See application file for complete search history.

(56) References Cited

U.S. PATENT DOCUMENTS 2,594,394 A * 4/1952 Casselman ........... B65D 5/3628 229/160
3,669,345 A * 6/1972 Cole .................... B65D 5/5425 229/101.2
3,690,544 A * 9/1972 Meyers ................ B65D 77/062 229/101.2

(Continued)

*Primary Examiner* — Christopher R Demeree
(74) *Attorney, Agent, or Firm* — Dennemeyer & Associates LLC

(57) ABSTRACT

The present invention relates to a folding carton blank for packaging cosmetic compositions, to a method for the preparation of a folding carton for packaging cosmetic compositions, to a folding carton for packaging cosmetic compositions and to a method for the preparation of at least one folding carton blank for packaging cosmetic compositions. Further, the present invention relates to the use of a folding carton for packaging cosmetic compositions, especially for packaging cosmetic hair compositions.

13 Claims, 3 Drawing Sheets

(56) References Cited

U.S. PATENT DOCUMENTS

Figure 1:
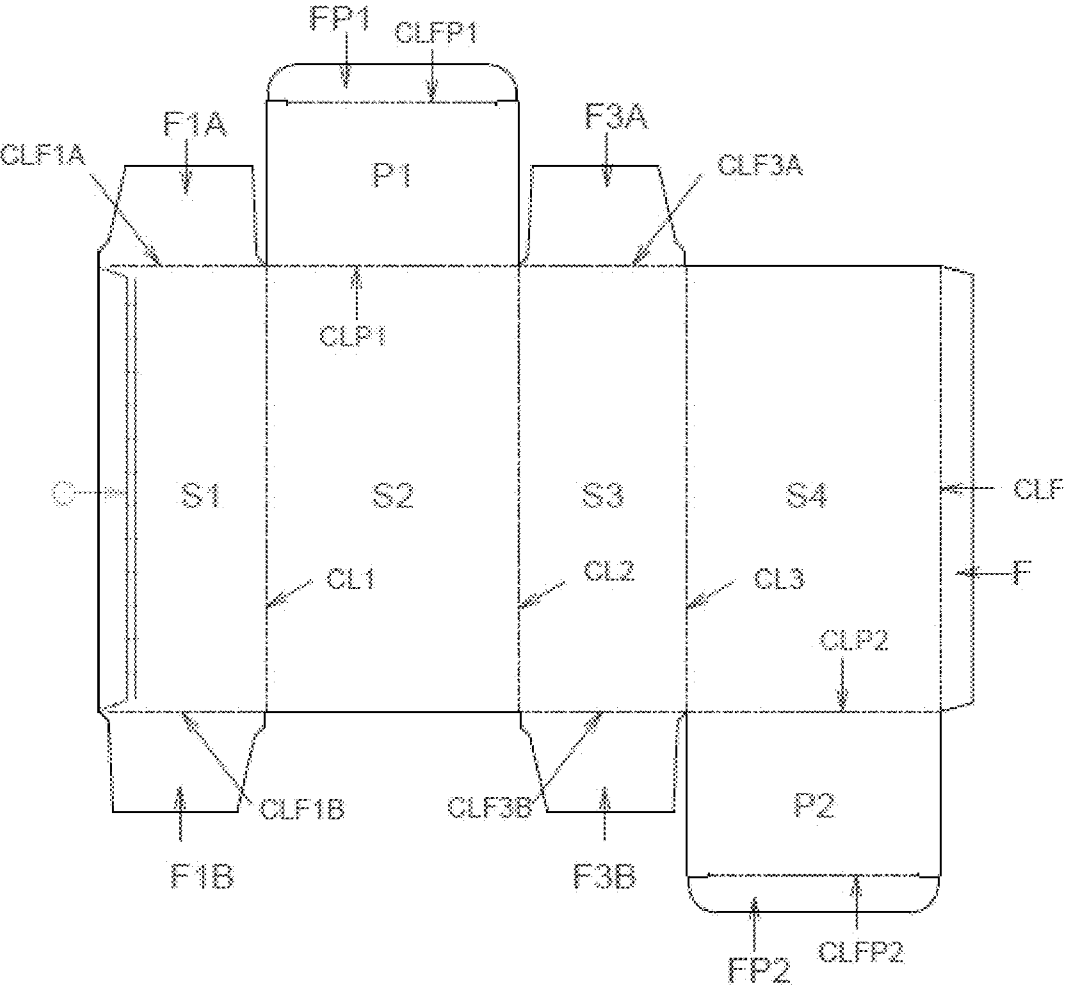

| | | | | |
|---|---|---|---|---|
| 6,957,763 | B2 * | 10/2005 | Huffman | B65D 5/727 229/219 |
| 11,623,785 | B2 * | 4/2023 | Walters | B65D 5/541 229/240 |
| 2006/0255107 | A1 * | 11/2006 | Wright | B65D 5/064 229/101.2 |

* cited by examiner

FOLDING CARTON AND FOLDING CARTON BLANK FOR PACKAGING COSMETIC COMPOSITIONS

CROSS-REFERENCE TO RELATED APPLICATIONS

This is a Paris Convention application, which claims priority to European Application 23182072.1, filed on Jun. 28, 2023, of which is hereby incorporated by reference in its entirety.

FIELD OF THE INVENTION

The present invention relates to a folding carton blank for packaging cosmetic compositions, to a method for the preparation of a folding carton for packaging cosmetic compositions, to a folding carton for packaging cosmetic compositions and to a method for the preparation of at least one folding carton blank for packaging cosmetic compositions. Further, the present invention relates to the use of a folding carton for packaging cosmetic compositions, especially for packaging cosmetic hair compositions.

BACKGROUND OF THE INVENTION

In the cosmetic industry, clever packaging or packaging materials that are above all sustainable have become increasingly important in recent years. For example, an environmentally friendly method of packaging cosmetic products that require product descriptions, consumer information and/or instructions for use is to pack them in a carton where the product description, the consumer information and/or instructions for use are not separately enclosed in a leaflet but are instead printed on the inside of the packaging carton. To get the needed information, consumers, therefore, must tear or cut the packaging carton first. Unfortunately, by tearing the packaging carton, the printed areas are often damaged, so that it is difficult for consumers to read all the needed information. However, opening the packaging carton by cutting is also disadvantageous as a cutting device is always necessary. In addition, there are often no instructions on the packaging carton as to where exactly to open it.

The object of the present invention therefore was to provide an improved carton for packaging cosmetic compositions which does not retain the disadvantages of the prior art or only in diminished form. In addition, the carton should be easy to produce at relatively low costs.

SUMMARY

This object is achieved by a folding carton blank for packaging cosmetic compositions comprising

- four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4),
- a first panel (P1) which is hinged to the second side panel (S2) via a crease line (CLP1), wherein the crease line (CLP1) is at a right angle to the first crease line (CL1) and the second crease line (CL2),
- a second panel (P2) which is hinged to the fourth side panel (S4) via a crease line (CLP2), wherein the crease line (CLP2) is opposite the crease line (CLP1) and at a right angle to the third crease line (CL3),
- a flap (FP1) which is hinged to the first panel (P1) via a crease line (CLFP1), wherein the crease line (CLFP1) is parallel to the crease line (CLP1),
- a flap (FP2) which is hinged to the second panel (P2) via a crease line (CLFP2), wherein the crease line (CLFP2) is parallel to the crease line (CLP2), and
- a flap (F) which is hinged to the fourth side panel (S4) via a crease line (CLF), wherein the crease line (CLF) is parallel to the third crease line (CL3), and
- wherein the first side panel (S1) comprises a half-cut line (C), and
- wherein the folding carton blank further comprises
- an outer layer (OL),
- an inner layer (IL), wherein the inner layer (IL) comprises information for using the cosmetic composition, and
- at least one middle layer (ML) which is located between the outer layer (OL) and the inner layer (IL),
- wherein the half-cut line (C) pierces the inner layer (IL) completely and optionally the at least one middle layer (ML) at least partially, and
- wherein the flap (F) comprises a glue area (G), wherein on the glue area (G) glue can be applied and wherein the glue area (G) is located on the outer layer (OL) of the flap (F), and
- wherein the outer layer (OL) of the flap (F) can be fixed to the inner layer (IL) of the first side panel (S1) so that the half-cut line (C) surrounds the glue area (G) at least partially and the glue area (G) does not touch the half-cut line (C).

This object is further achieved by a method for the preparation of a folding carton, wherein the method comprises the steps:

- a) providing an inventive folding carton blank,
- b) applying a glue on the glue area (G),
- c) folding the folding carton blank along the crease lines (CL2, CLF),
- d) fixing the outer layer (OL) of the flap (F) to the inner layer (IL) of the first side panel (S1) by pressing, so that the half-cut line (C) surrounds the glue area (G) at least partially and the glue area (G) does not touch the half-cut line (C),
- e) unfolding the folding carton blank along the first and third crease lines (CL1, CL3) to obtain a rectangular mould closed at the sides, wherein the inner layer (IL) is inside the rectangular mould and the outer layer (OL) is outside the rectangular mould, and
- f) close the rectangular mould obtained in step e) by folding the crease lines (CLP1, CLP2, CLFP1, CLFP2) to obtain the folding carton, and by a folding carton for packaging cosmetic compositions obtained by this process.

It has surprisingly been found that, by using the inventive folding carton for cosmetic compositions, the use of a separate leaflet information can be avoided, which reduces complexity, costs, paper materials and $CO_2$ emissions.

Furthermore, the inventive folding carton can easily and safely be opened by a consumer without damaging the printed areas. The consumer simply has to tear the carton to open; the inconvenient use of a cutting device is not necessary.

In case the flaps (F1A, F1B) comprise arrows, wherein the arrows are printed on the outer layer (OL) and/or on the inner layer (IL) of the inventive folding carton and indicate the starting point of tearing, the consumer knows immediately where to open the carton, and a controlled opening at the overlapping glue area is ensured.

By further arrows, printed on the inner layer (IL), for example, of the first panel (P1), which indicate that there are instructions in the inner side of the inventive folding carton, the visibility of the printed leaflet information inside the inventive folding carton can be significantly facilitated.

Furthermore, in case the outer layer (OL) also comprises the description of the content of the inventive folding carton, the consumer is also informed that the description, the consumer information and/or instructions for use are printed inside the folding carton.

DETAILED DESCRIPTION

The present invention will be described in more detail hereinafter.

Folding Carton Blank

The folding carton blank for packaging cosmetic compositions comprises four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4).

The term "crease line", in the present case, is understood to mean a line along which the folding carton blank must be folded or unfolded to obtain the inventive folding carton. Preferably, the crease lines are prepared by grooving.

Preferably, the four side panels (S1, S2, S3, S4) have a rectangular shape. They can have any dimensions desired by a person skilled in the art. Preferably, the side panels (S2) and (S4) have a height (H) in the range from 8 to 24 cm, more preferably in the range from 11 to 21 cm, and most preferably in the range from 14 to 18 cm, and a width (W) in the range from 4 to 14 cm, more preferably in the range from 6 to 12 cm, and most preferably in the range from 8 to 10 cm; the side panels (S1) and (S3) preferably have a height (H) in the range from 8 to 24 cm, more preferably in the range from 11 to 21 cm, and most preferably in the range from 14 to 18 cm, and a length (L) in the range from 3 to 9 cm, preferably in the range from 4 to 8 cm, and most preferably in the range from 5 to 7 cm.

Figure 4:
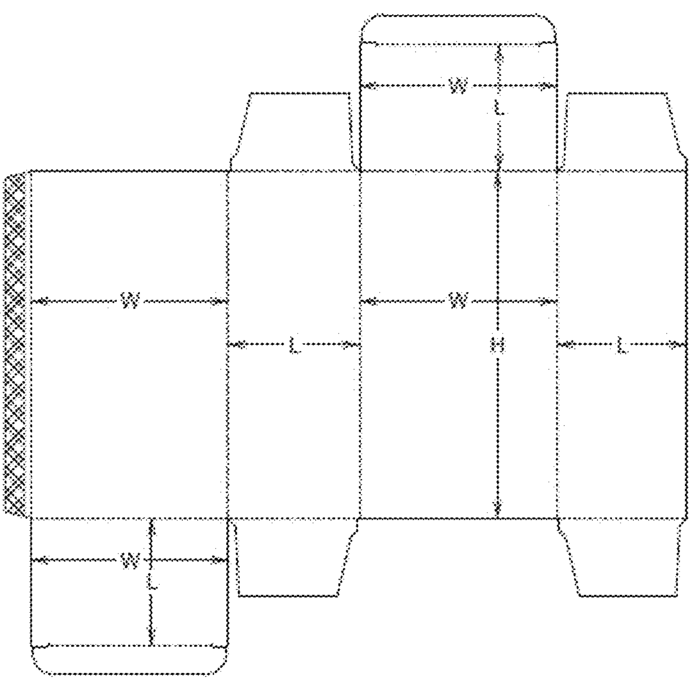

What, in the present case, is understood by the terms "height (H)", "width (W)" and "length (L)" is shown in FIG. 4, wherein FIG. 4 shows a folding carton blank for packaging cosmetic compositions with the outer layer (OL) facing upwards.

In a preferred embodiment, the height (H) of the three crease lines (CL1, CL2, CL3) is identical to the height (H) of the four side panels (S1, S2, S3, S4). Consequently, the three crease lines (CL1, CL2, CL3) preferably also have a height (H) in the range from 8 to 24 cm, more preferably in the range from 11 to 21 cm, and most preferably in the range from 14 to 18 cm. Preferably, the three crease lines (CL1, CL2, CL3) are each parallel to each other.

The folding carton blank further comprises a first panel (P1) which is hinged to the second side panel (S2) via a crease line (CLP1), wherein the crease line (CLP1) is at a right angle to the first crease line (CL1) and to the second crease line (CL2).

Also, the first panel (P1) preferably has a rectangular shape. The first panel (P1) can have any dimensions desired by a person skilled in the art. In a preferred embodiment, the width (W) of the first panel (P1) is identical to the width (W) of the second side panel (S2) and the length (L) of the first panel (P1) is identical to the length (L) of the first and the third side panel (S1, S3).

Consequently, the first panel (P1) preferably has a width (W) in the range from 4 to 14 cm, more preferably in the range from 6 to 12 cm, and most preferably in the range from 8 to 10 cm, and a length (L) in the range from 3 to 9 cm, preferably in the range from 4 to 8 cm, and most preferably in the range from 5 to 7 cm.

In a preferred embodiment, the crease line (CLP1) has the same width (W) as the second side panel (S2). Therefore, the crease line (CLP1) has preferably a width (W) in the range from 4 to 14 cm, more preferably in the range from 6 to 12 cm, and most preferably in the range from 8 to 10 cm.

The folding carton blank also comprises a second panel (P2) which is hinged to the fourth side panel (S4) via a crease line (CLP2), wherein the crease line (CLP2) is opposite the crease line (CLP1) and at a right angle to the third crease line (CL3).

Also, the second panel (P2) preferably has a rectangular shape. The second panel (P2) can have any dimensions desired by a person skilled in the art. In a preferred embodiment, the width (W) of the second panel (P2) is identical to the width (W) of the fourth side panel (S4) and the length (L) of the second panel (P2) is identical to the length (L) of the first and third side panel (S1, S3).

Preferably, the second panel (P2) consequently has a width (W) in the range from 4 to 14 cm, more preferably in the range from 6 to 12 cm, and most preferably in the range from 8 to 10 cm, and a length (L) in the range from 3 to 9 cm, preferably in the range from 4 to 8 cm, and most preferably in the range from 5 to 7 cm.

In a preferred embodiment, the crease line (CLP2) has the same width (W) as the fourth side panel (S4). As a result, the crease line (CLP2) has preferably a width (W) in the range from 4 to 14 cm, more preferably in the range from 6 to 12 cm, and most preferably in the range from 8 to 10 cm.

The folding carton blank also comprises a flap (FP1) which is hinged to the first panel (P1) via a crease line (CLFP1), wherein the crease line (CLFP1) is parallel to the crease line (CLP1), and a flap (FP2) which is hinged to the second panel (P2) via a crease line (CLFP2), wherein the crease line (CLFP2) is parallel to the crease line (CLP2).

Preferably, the crease lines (CLFP1, CLFP2) have an identical width (W) as the crease lines (CLP1, CLP2). Preferably, they also have a width (W) in the range from 4 to 14 cm, more preferably in the range from 6 to 12 cm, and most preferably in the range from 8 to 10 cm.

Furthermore, the folding carton blank also comprises a flap (F) which is hinged to the fourth side panel (S4) via a crease line (CLF), wherein the crease line (CLF) is parallel to the third crease line (CL3).

The crease line (CLF) preferably has an identical height (H) as the three crease lines (CL1, CL2, CL3). Preferably, the crease line (CLF) has a height (H) in the range from 8 to 24 cm, more preferably in the range from 11 to 21 cm, and most preferably in the range from 14 to 18 cm.

The folding carton blank further comprises

- an outer layer (OL),
- an inner layer (IL), wherein the inner layer (IL) comprises information for using the cosmetic composition, and
- at least one middle layer (ML) which is located between the outer layer (OL) and the inner layer (IL).

As material for the folding carton blank, any material known to a skilled person and suitable for the preparation of a folding carton (blank) can be used.

The inventive folding carton blank can have any thickness desired by a person skilled in the art. The overall thickness (T) of the folding carton blank is preferably in the range from 383 to 631 μm, more preferably in the range from 400 to 500 μm, determined according to TAPPI 411.

Figure 3:
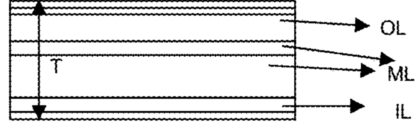

What, in the present case, is understood by the term "overall thickness (T)" is shown in FIG. 3, wherein FIG. 3 shows a cross section of the folding carton blank.

A further object of the present invention is therefore a folding carton blank, wherein the folding carton blank has an overall thickness (T) in the range from 383 to 631 μm, determined according to TAPPI 411.

The folding carton blank preferably has a grammage in the range from 230 to 357 g/m$^2$, more preferably in the range from 250 to 290 g/m$^2$, determined according to TAPPI 410.

An example for a suitable folding carton blank is the CMPC Graphics GC1 270 g/m$^2$ 18 pts.

The outer layer (OL) is preferably double-coated, and preferably comprises bleached chemical pulp. Preferably, the outer layer (OL) has a thickness in the range from 77 to 126 μm and the double-coating has a thickness in the range from 57 to 95 μm.

A further object of the present invention is therefore a folding carton blank, wherein the outer layer (OL)

i) is double-coated, wherein the outer layer (OL) has a thickness in the range from 77 to 126 μm and the double-coating has a thickness in the range from 57 to 95 μm, and/or ii) comprises bleached chemical pulp Preferably, the inner layer (IL) comprises bleached chemical pulp. In a preferred embodiment, the inner layer (IL) is single-coated, wherein the inner layer (IL) has a thickness in the range from 57 to 95 μm and the single-coating has a thickness in the range from 38 to 63 μm.

A further object of the present invention is therefore a folding carton blank, wherein the inner layer (IL)

i) comprises bleached chemical pulp, and/or ii) is single-coated, wherein the inner layer (IL) has a thickness in the range from 57 to 95 μm and the single-coating has a thickness in the range from 38 to 63 μm.

The at least one middle layer (ML) preferably comprises bleached thermomechanical pulp (BTMP) and mill broke and has a thickness in the range from 154 to 252 μm.

A further object of the present invention is therefore a folding carton blank, wherein the at least one middle layer (ML)

i) comprises bleached thermomechanical pulp (BTMP) and mill broke, and/or ii) has a thickness in the range from 154 to 252 μm.

The first side panel (S1) comprises a half-cut line (C), wherein the half-cut line (C) pierces the inner layer (IL) completely and optionally the at least one middle layer (ML) at least partially.

The flap (F) comprises a glue area (G), wherein on the glue area (G) glue can be applied, and wherein the glue area (G) is located on the outer layer (OL) of the flap (F), and the outer layer (OL) of the flap (F) can be fixed to the inner layer (IL) of the first side panel (S1) so that the half-cut line (C) surrounds the glue area (G) at least partially and the glue area (G) does not touch the half-cut line (C).

A person skilled in the art knows that the fixing of the outer layer (OL) of the flap (F) to the inner layer (IL) of the first side panel (S1) is effected by the glue.

The term "half-cut line (C)", in the present case, is understood to mean a line which pierces the inner layer (IL) completely and optionally the at least one middle layer (ML) at least partially. Preferably, the "half-cut line (C)" is a continuous line, preferably prepared by half-cutting using a cutting machine.

Preferably, the half-cut line (C) has a depth in the range from 95 to 377 μm. In a preferred embodiment, the half-cut line (C) has a depth of at most 60%, more preferably of at most 50%, of the overall thickness (T) of the folding carton blank.

A further object of the present invention is therefore a folding carton blank, wherein the half-cut line (C) has a depth i) of at most 60% of the overall thickness (T) of the folding carton blank, and/or ii) in the range from 95 to 377 μm.

In a preferred embodiment, the half-cut line (C) has a depth of at least 20% of the overall thickness (T) of the folding carton blank, and of at most 60%, preferably of at most 50%, of the overall thickness (T) of the folding carton blank.

In a preferred embodiment, the crease line (CLF) and the glue area (G) have a distance of at least 2.8 mm, preferably of at least 2.9 mm, more preferably of at least 3 mm, and especially preferably of at least 3.1 mm.

In a further preferred embodiment, the crease line (CLF) and the glue area (G) have a distance of at most 3.6 mm, preferably of at most 3.5 mm, more preferably of at most 3.4 mm, and especially preferably of at most 3.3 mm.

A further object of the present invention is therefore a folding carton blank, wherein the crease line (CLF) and the glue area (G) have a distance of i) at least 2.8 mm, preferably of at least 2.9 mm, more preferably of at least 3 mm, and especially preferably of at least 3.1 mm, and/or ii) at most 3.6 mm, preferably of at most 3.5 mm, more preferably of at most 3.4 mm, and especially preferably of at most 3.3 mm.

Therefore, in a preferred embodiment, the crease line (CLF) and the glue area (G) have a distance in the range from 2.8 to 3.6 mm, preferably in the range from 2.9 to 3.5 mm and more preferably in the range from 3 to 3.4 mm. In an especially preferred embodiment, the half-cut line (C) and the glue area (G) have a distance in the range from 3.1 to 3.3 mm.

In a most preferred embodiment, the crease line (CLF) and the glue area (G) have a distance of 3.17 mm.

The glue which can be applied on the glue area (G) can be any glue suitable for being applied on a folding carton blank.

In a further preferred embodiment, the folding carton blank further comprises two additional flaps (F1A, F1B) and two additional flaps (F3A, F3B), wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3), and wherein the flaps (F1A, F1B) can comprise arrows, wherein the arrows are printed on the outer layer (OL) and/or on the inner layer (IL).

A further object of the present invention is therefore a folding carton blank, wherein the folding carton blank further comprises two additional flaps (F1A, F1B) and two additional flaps (F3A, F3B), wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3), and wherein the flaps (F1A, F1B) comprise arrows, wherein the arrows are printed on the outer layer (OL) and/or on the inner layer (IL).

Preferably, the crease lines (CLF1A, CLF1B) have the same length (L) as the first side panel (S1), preferably a length (L) in the range from 3 to 9 cm, preferably in the range from 4 to 8 cm, and most preferably in the range from 5 to 7 cm.

The crease lines (CLF3A, CLF3B) preferably have the same length (L) as the third side panel (S3), preferably a length (L) in the range from 3 to 9 cm, preferably in the range from 4 to 8 cm, and most preferably in the range from 5 to 7 cm.

Preparation of the Folding Carton Blank

A method for the preparation of at least one folding carton blank for packaging cosmetic compositions comprises the steps:

a) providing a pre-blank of the at least one folding carton blank, wherein the pre-blank is an unprinted flat carton sheet, wherein the unprinted flat carton sheet comprises
   an outer layer (OL),
   an inner layer (IL), and
   at least one middle layer (ML) which is located between the outer layer (OL) and the inner layer (IL), and
   wherein the unprinted flat carton sheet has dimensions that allow at least one folding carton blank to be die-cut,
b) imprinting the pre-blank of the at least one folding carton blank, so that the inner layer (IL) of the at least one carton blank comprises information for using the cosmetic composition, and
c) treating the imprinted pre-blank obtained in step b) simultaneously with a cutting machine and a grooving device to obtain the at least one folding carton blank for packaging cosmetic compositions, wherein the treatment with the cutting machine is carried out to die-cut the at least one folding carton-blank and to obtain the half-cut line (C), and the treatment with the grooving device is carried out to obtain the crease lines (CL1, CL2, CL3, CLF, CLP1, CLP2, CLFP1, CLFP2).

A further object of the present invention is therefore also a method for the preparation of at least one folding carton blank for packaging cosmetic compositions, wherein the method comprises the steps:

a) providing a pre-blank of the at least one folding carton blank, wherein the pre-blank is an unprinted flat carton sheet, wherein the unprinted flat carton sheet comprises
   an outer layer (OL),
   an inner layer (IL), and
   at least one middle layer (ML) which is located between the outer layer (OL) and the inner layer (IL), and
   wherein the unprinted flat carton sheet has dimensions that allow at least one folding carton blank to be die-cut,
b) imprinting the pre-blank of the at least one folding carton blank, so that the inner layer (IL) of the at least one carton blank comprises information for using the cosmetic composition, and
c) treating the imprinted pre-blank obtained in step b) simultaneously with a cutting machine and a grooving device to obtain the at least one folding carton blank for packaging cosmetic compositions, wherein the treatment with the cutting machine is carried out to die-cut the at least one folding carton-blank and to obtain the half-cut line (C), and the treatment with the grooving device is carried out to obtain the crease lines (CL1, CL2, CL3, CLF, CLP1, CLP2, CLFP1, CLFP2).

Step a)

In step a), a pre-blank of the at least one folding carton blank is provided.

The term "pre-blank", in the present case, is understood to mean an unprinted flat carton sheet, wherein the unprinted flat carton sheet comprises an outer layer (OL), an inner layer (IL), and at least one middle layer (ML) which is located between the outer layer (OL) and the inner layer (IL), and wherein the unprinted flat carton sheet has dimensions that allow at least one folding carton blank to be die-cut. The pre-blank does not yet have any crease lines or a half-cut line.

Step b)

In step b), the pre-blank of the at least one folding carton blank is imprinted, so that the inner layer (IL) of the at least one carton blank comprises information for using the cosmetic composition.

In case the at least one folding carton blank comprises flaps (F4A, F4B), in this step, preferably, the pre-blank of the at least one folding carton blank is also imprinted, so that the flaps (F4A, F4B) of the at least one carton blank comprise arrows on the outer layer (OL) and/or on the inner layer (IL).

In this step, preferably, the pre-blank of the at least one folding carton blank is also imprinted, so that the inner layer (IL), for example, of the first panel (P1) comprises further arrows.

In a preferred embodiment, in this step, the pre-blank of the at least one folding carton blank is also imprinted, so that the outer layer (OL) also comprises the description of the content of the later inventive folding carton.

Step c)

In step c), the imprinted pre-blank obtained in step b) is simultaneously treated with a cutting machine and a grooving device to obtain the at least one folding carton blank for packaging cosmetic compositions, wherein the treatment with the cutting machine is carried out to die-cut the at least one folding carton-blank and to obtain the half-cut line (C), and the treatment with the grooving device is carried out to obtain the crease lines (CL1, CL2, CL3, CLF, CLP1, CLP2, CLFP1, CLFP2).

Preferably, the cutting machine comprises die-cutting blades for the die-cut and half-cutting blades for obtaining the half-cut line (C).

In case the at least one folding carton blank further comprises two additional flaps (F1A, F1B) and two additional flaps (F3A, F3B), by the treatment with the grooving device, also the crease lines (CLF1A, CLF1B, CLF3A, CLF3B) are obtained.

It is possible, by this method, to produce several, for example, six folding carton blanks. However, it is also possible to produce more than six folding carton blanks Method for the Preparation of a Folding Carton A further object of the present invention is a method for the preparation of a folding carton, wherein the method comprises the steps:

a) providing an inventive folding carton blank as mentioned above,
b) applying a glue on the glue area (G),
c) folding the folding carton blank along the crease lines (CL2, CLF),
d) fixing the outer layer (OL) of the flap (F) to the inner layer (IL) of the first side panel (S1) by pressing, so that the half-cut line (C) surrounds the glue area (G) at least partially and the glue area (G) does not touch the half-cut line (C),
e) unfolding the folding carton blank along the first and third crease lines (CL1, CL3) to obtain a rectangular mould closed at the sides, wherein the inner layer (IL) is inside the rectangular mould and the outer layer (OL) is outside the rectangular mould, and
f) close the rectangular mould obtained in step e) by folding the crease lines (CLP1, CLP2, CLFP1, CLFP2) to obtain the folding carton.

In a preferred embodiment, step b) is carried out after step a), step c) is carried out after step b), step d) is carried out after step c), step e) is carried out after step d) and step f) is carried out after step e). However, step c) can also be carried out before step b). Between step e) and step f), or during step f), the desired content of the folding carton, for example, a cosmetic hair composition can be packaged.

Preferably, steps a) to d) are carried out by the supplier of the inventive folding carton blank, steps e) and f) are preferably carried out in the plant of the manufacturer of the cosmetic composition.

It is clear for the skilled person that in case the folding carton blank also comprises two additional flaps (F1A, F1B) and two additional flaps (F3A, F3B), also the crease lines (CLF1A, CLF1B, CLF3A, CLF3B) are folded in step f) to obtain the folding carton.

Folding Carton

A further object of the present invention is a folding carton for packaging cosmetic compositions obtained by the inventive process mentioned above.

The inventive folding carton can have any desired dimensions. In a preferred embodiment the folding carton has a height (H) in the range from 8 to 24 cm, a width (W) in the range from 4 to 14 cm and a length (L) in the range from 3 to 9 cm.

A further object of the present invention is therefore a folding carton for packaging cosmetic compositions, wherein the folding carton has a height (H) in the range from 8 to 24 cm, a width (W) in the range from 4 to 14 cm and a length (L) in the range from 3 to 9 cm.

In a more preferred embodiment, the folding carton has a height (H) in the range from 11 to 21 cm, a width (W) in the range from 6 to 12 cm and a length (L) in the range from 4 to 8 cm.

In a most preferred embodiment, the folding carton has a height (H) in the range from 14 to 18 cm, a width (W) in the range from 8 to 10 cm and a length (L) in the range from 5 to 7 cm.

In another preferred embodiment, the inventive folding carton has a height (H) in the range from 13 to 17 cm, a width (W) in the range from 2 to 6 cm and a length (L) in the range from 2 to 6 cm. It is clear for a skilled person that, in this embodiment, the dimensions of the (side) panels, flaps, crease lines and of the half-cut line (C) are amended accordingly.

In a further preferred embodiment, the folding carton has a height (H) in the range from 16 to 25 cm, a width (W) in the range from 11 to 17 cm and a length (L) in the range from 3 to 7 cm. It is clear for a skilled person that, also in this embodiment, the dimensions of the (side) panels, flaps, crease lines and of the half-cut line (C) are amended accordingly.

Use

The inventive folding carton can be used for packaging cosmetic compositions, preferably for packaging cosmetic hair compositions.

The cosmetic hair compositions can be professional or retail. Examples for cosmetic hair compositions are hair colours, straightening care and bleaching products. These cosmetic hair compositions can be packaged separately or as a kit.

In a more preferred embodiment, the inventive folding carton can be used for packaging retail cosmetic hair compositions.

Therefore, a further object of the present invention is the use of the folding carton for packaging cosmetic compositions, preferably for packaging cosmetic hair compositions, more preferably for packaging retail cosmetic hair compositions.

In another preferred embodiment, the inventive folding carton can be used for packaging care products, for example, nail, body, beard, and hand care products.

In the following, there is provided a list of embodiments to further illustrate the present disclosure without intending to limit the disclosure to the specific embodiments listed below.

Embodiments

1. Folding carton blank for packaging cosmetic compositions comprising
   four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4),
   a first panel (P1) which is hinged to the second side panel (S2) via a crease line (CLP1), wherein the crease line (CLP1) is at a right angle to the first crease line (CL1) and to the second crease line (CL2),
   a second panel (P2) which is hinged to the fourth side panel (S4) via a crease line (CLP2), wherein the crease line (CLP2) is opposite the crease line (CLP1) and at a right angle to the third crease line (CL3),
   a flap (FP1) which is hinged to the first panel (P1) via a crease line (CLFP1), wherein the crease line (CLFP1) is parallel to the crease line (CLP1),
   a flap (FP2) which is hinged to the second panel (P2) via a crease line (CLFP2), wherein the crease line (CLFP2) is parallel to the crease line (CLP2), and a flap (F) which is hinged to the fourth side panel (S4) via a crease line (CLF), wherein the crease line (CLF) is parallel to the third crease line (CL3), and wherein the first side panel (S1) comprises a half-cut line (C), and wherein the folding carton blank further comprises an outer layer (OL), an inner layer (IL), wherein the inner layer (IL) comprises information for using the cosmetic composition, and at least one middle layer (ML) which is located between the outer layer (OL) and the inner layer (IL), wherein the half-cut line (C) pierces the inner layer (IL) completely and optionally the at least one middle layer (ML) at least partially, and wherein the flap (F) comprises a glue area (G), wherein on the glue area (G) glue can be applied and wherein the glue area (G) is located on the outer layer (OL) of the flap (F), and wherein the outer layer (OL) of the flap (F) can be fixed to the inner layer (IL) of the first side panel (S1) so that the half-cut line (C) surrounds the glue area (G) at least partially and the glue area (G) does not touch the half-cut line (C).

2. Folding carton blank for packaging cosmetic compositions according to embodiment 1, wherein the folding carton blank has an overall thickness (T) in the range from 383 to 631 μm, determined according to TAPPI 411.

3. Folding carton blank for packaging cosmetic compositions according to embodiments 1 or 2, wherein the inner layer (IL) comprises bleached chemical pulp.

4. Folding carton blank for packaging cosmetic compositions according to any one of the preceding embodiments, wherein the inner layer (IL) is single-coated, wherein the inner layer (IL) has a thickness in the range from 57 to 95 μm and the single-coating has a thickness in the range from 38 to 63 μm.

5. Folding carton blank for packaging cosmetic compositions according to any one of the preceding embodiments, wherein the outer layer (OL) is double-coated, wherein the outer layer (OL) has a thickness in the range from 77 to 126 μm and the double-coating has a thickness in the range from 57 to 95 μm.

6. Folding carton blank for packaging cosmetic compositions according to any one of the preceding embodiments, wherein the outer layer (OL) comprises bleached chemical pulp.

7. Folding carton blank for packaging cosmetic compositions according to any one of the preceding embodiments, wherein the at least one middle layer (ML) comprises bleached thermomechanical pulp (BTMP) and mill broke.

8. Folding carton blank for packaging cosmetic compositions according to any one of the preceding embodiments, wherein the crease line (CLF) and the glue area (G) have a distance of at least 2.8 mm, preferably of at least 2.9 mm, more preferably of at least 3 mm, and especially preferably of at least 3.1 mm.

9. Folding carton blank for packaging cosmetic compositions according to any one of the preceding embodiments, wherein the crease line (CLF) and the glue area (G) have a distance of at most 3.6 mm, preferably of at most 3.5 mm, more preferably of at most 3.4 mm, and especially preferably of at most 3.3 mm.

10. Folding carton blank for packaging cosmetic compositions according to any one of the preceding embodiments, wherein the half-cut line (C) and the glue area (G) have a distance in the range from 2.8 to 3.6 mm, preferably in the range from 2.9 to 3.5 mm and more preferably in the range from 3 to 3.4 mm. In an especially preferred embodiment, the half-cut line (C) and the glue area (G) have a distance in the range from 3.1 to 3.3 mm.

11. Folding carton blank for packaging cosmetic compositions according to any one of the preceding embodiments, wherein the half-cut line (C) and the glue area (G) have a distance of 3.17 mm.

12. Folding carton blank for packaging cosmetic compositions according to any one of the preceding embodiments, wherein the half-cut line (C) has a depth i) of at most 60% of the overall thickness (T) of the folding carton blank, and/or ii) in the range from 95 to 377 μm.

13. Folding carton blank for packaging cosmetic compositions according to any one of the preceding embodiments, wherein the folding carton blank further comprises two additional flaps (F1A, F1B) and two additional flaps (F3A, F3B), wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3), and wherein the flaps (F1A, F1B) comprise arrows, wherein the arrows are printed on the outer layer (OL) and/or on the inner layer (IL).

14. A method for the preparation of a folding carton for packaging cosmetic compositions, wherein the method comprises the steps:

a) providing a folding carton blank according to any one of embodiments 1 to 13 b) applying a glue on the glue area (G), c) folding the folding carton blank along the crease lines (CL2, CLF), d) fixing the outer layer (OL) of the flap (F) to the inner layer (IL) of the first side panel (S1) by pressing, so that the half-cut line (C) surrounds the glue area (G) at least partially and the glue area (G) does not touch the half-cut line (C), e) unfolding the folding carton blank along the first and third crease lines (CL1, CL3) to obtain a rectangular mould closed at the sides, wherein the inner layer (IL) is inside the rectangular mould and the outer layer (OL) is outside the rectangular mould, and f) close the rectangular mould obtained in step e) by folding the crease lines (CLP1, CLP2, CLFP1, CLFP2) to obtain the folding carton.

15. A method for the preparation of a folding carton for packaging cosmetic compositions according to embodiment 14, wherein step b) is carried out after step a), step c) is carried out after step b), step d) is carried out after step c), step e) is carried out after step d) and step f) is carried out after step e).

16. A method for the preparation of a folding carton for packaging cosmetic compositions according to embodiment 14, wherein step c) is carried out before step b).
17. A folding carton for packaging cosmetic compositions obtained by a process according to any one of embodiments 14 to 16.
18. A folding carton for packaging cosmetic compositions according to embodiment 17, wherein the folding carton has a height (H) in the range from 8 to 24 cm, a width (W) in the range from 4 to 14 cm and a length (L) in the range from 3 to 9 cm.
19. A folding carton for packaging cosmetic compositions according to embodiment 18, wherein the folding carton has a height (H) in the range from 11 to 21 cm, a width (W) in the range from 6 to 12 cm and a length (L) in the range from 4 to 8 cm.
20. A folding carton for packaging cosmetic compositions according to embodiment 19, wherein the folding carton has a height (H) in the range from 14 to 18 cm, a width (W) in the range from 8 to 10 cm and a length (L) in the range from 5 to 7 cm.
21. A method for the preparation of at least one folding carton blank for packaging cosmetic compositions according to any one of embodiments 1 to 13, wherein the method comprises the steps:
    a) providing a pre-blank of the at least one folding carton blank, wherein the pre-blank is an unprinted flat carton sheet, wherein the unprinted flat carton sheet comprises
        an outer layer (OL),
        an inner layer (IL), and
        at least one middle layer (ML) which is located between the outer layer (OL) and the inner layer (IL), and
        wherein the unprinted flat carton sheet has dimensions that allow at least one folding carton blank to be die-cut,
    b) imprinting the pre-blank of the at least one folding carton blank, so that the inner layer (IL) of the at least one carton blank comprises information for using the cosmetic composition, and
    c) treating the imprinted pre-blank obtained in step b) simultaneously with a cutting machine and a grooving device to obtain the at least one folding carton blank for packaging cosmetic compositions, wherein the treatment with the cutting machine is carried out to die-cut the at least one folding carton-blank and to obtain the half-cut line (C), and the treatment with the grooving device is carried out to obtain the crease lines (CL1, CL2, CL3, CLF, CLP1, CLP2, CLFP1, CLFP2).
22. The use of the folding carton for packaging cosmetic compositions according to any one of the embodiments 17 to 20, preferably for packaging cosmetic hair compositions, more preferably for packaging retail cosmetic hair compositions.

While the presently claimed invention has been described in terms of its specific embodiments, certain modifications and equivalents will be apparent to those skilled in the art and are intended to be included within the scope of the presently claimed invention.

FIGURES

The present invention is more particularly elucidated by the following figures without being restricted thereto.

FIG. 1 shows a folding carton blank for packaging cosmetic compositions with the inner layer (IL) facing upwards. The folding carton blank comprises

- four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4),
- a first panel (P1) which is hinged to the second side panel (S2) via a crease line (CLP1), wherein the crease line (CLP1) is at a right angle to the first crease line (CL1) and to the second crease line (CL2),
- a second panel (P2) which is hinged to the fourth side panel (S4) via a crease line (CLP2), wherein the crease line (CLP2) is opposite the crease line (CLP1) and at a right angle to the third crease line (CL3),
- a flap (FP1) which is hinged to the first panel (P1) via a crease line (CLFP1), wherein the crease line (CLFP1) is parallel to the crease line (CLP1),
- a flap (FP2) which is hinged to the second panel (P2) via a crease line (CLFP2), wherein the crease line (CLFP2) is parallel to the crease line (CLP2), and
- a flap (F) which is hinged to the fourth side panel (S4) via a crease line (CLF), wherein the crease line (CLF) is parallel to the third crease line (CL3), and
- wherein the first side panel (S1) comprises a half-cut line (C), wherein the half-cut line (C) pierces the inner layer (IL) completely and optionally the at least one middle layer (ML) at least partially. The folding carton blank of FIG. 1 also comprises
- two additional flaps (F1A, F1B) and
- two additional flaps (F3A, F3B),
- wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and
- wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3).

Figure 2:
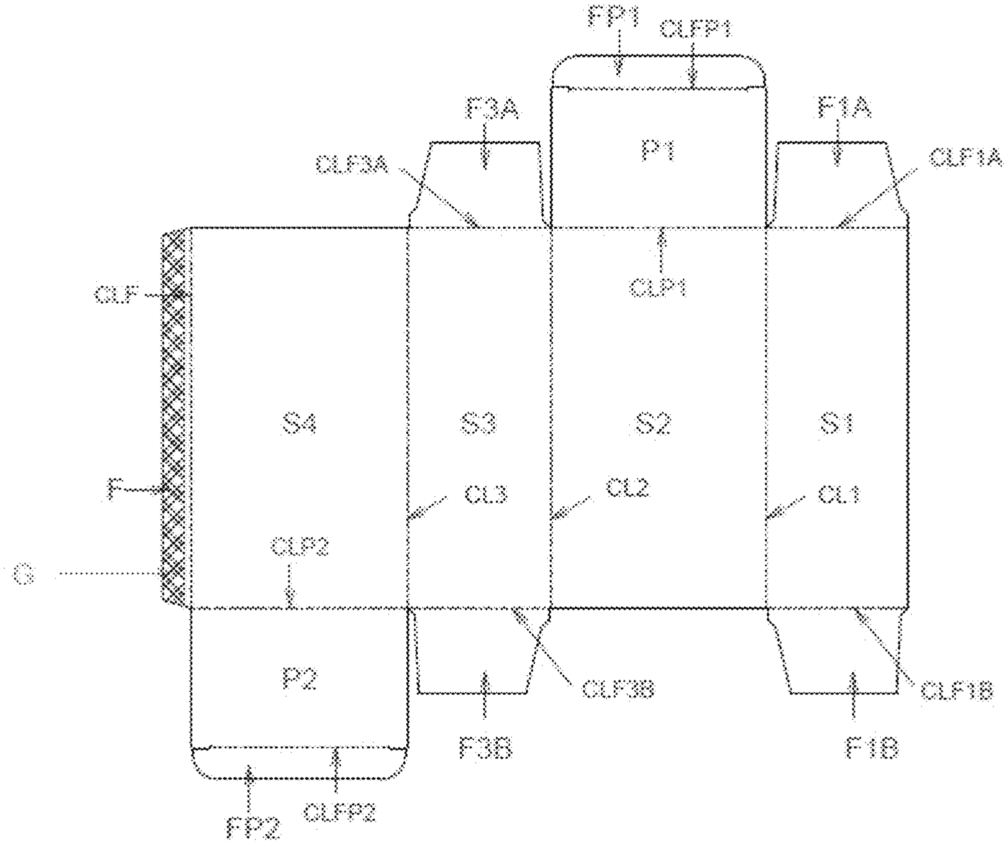

FIG. 2 shows a folding carton blank for packaging cosmetic compositions with the outer layer (OL) facing upwards. The folding carton blank comprises

- four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4),
- a first panel (P1) which is hinged to the second side panel (S2) via a crease line (CLP1), wherein the crease line (CLP1) is at a right angle to the first crease line (CL1) and to the second crease line (CL2),
- a second panel (P2) which is hinged to the fourth side panel (S4) via a crease line (CLP2), wherein the crease line (CLP2) is opposite the crease line (CLP1) and at a right angle to the third crease line (CL3), a flap (FP1) which is hinged to the first panel (P1) via a crease line (CLFP1), wherein the crease line (CLFP1) is parallel to the crease line (CLP1), a flap (FP2) which is hinged to the second panel (P2) via a crease line (CLFP2), wherein the crease line (CLFP2) is parallel to the crease line (CLP2), and a flap (F) which is hinged to the fourth side panel (S4) via a crease line (CLF), wherein the crease line (CLF) is parallel to the third crease line (CL3), and wherein the flap (F) comprises a glue area (G), wherein on the glue area (G) glue can be applied and wherein the glue area (G) is located on the outer layer (OL) of the flap (F), and wherein the outer layer (OL) of the flap (F) can be fixed to the inner layer (IL) of the first side panel (S1) so that the half-cut line (C) surrounds the glue area (G) at least partially and the glue area (G) does not touch the half-cut line (C). The folding carton blank of FIG. 2 also comprises two additional flaps (F1A, F1B) and two additional flaps (F3A, F3B), wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3).

FIG. 3 is a cross section of the folding carton blank showing the outer layer (OL), the inner layer (IL), and two middle layers (ML). The outer layer (OL) is double-coated, the inner layer (IL) is single-coated. In addition, also the overall thickness (T) of the folding carton blank is shown.

What, in the present case, is understood by the terms “height (H)”, “width (W)” and “length (L)” is shown in FIG. 4, wherein FIG. 4 shows a folding carton blank for packaging cosmetic compositions with the outer layer (OL) facing upwards.

The invention claimed is:

1. Folding carton blank for packaging cosmetic compositions comprising four side panels (S1, S2, S3, S4) which are hinged to one another in a row via three crease lines (CL1, CL2, CL3), wherein the first crease line (CL1) is located between the first side panel (S1) and the second side panel (S2), the second crease line (CL2) is located between the second side panel (S2) and the third side panel (S3) and the third crease line (CL3) is located between the third side panel (S3) and the fourth side panel (S4), a first panel (P1) which is hinged to the second side panel (S2) via a crease line (CLP1), wherein the crease line (CLP1) is at a right angle to the first crease line (CL1) and to the second crease line (CL2), a second panel (P2) which is hinged to the fourth side panel (S4) via a crease line (CLP2), wherein the crease line (CLP2) is opposite the crease line (CLP1) and at a right angle to the third crease line (CL3), a flap (FP1) which is hinged to the first panel (P1) via a crease line (CLFP1), wherein the crease line (CLFP1) is parallel to the crease line (CLP1), a flap (FP2) which is hinged to the second panel (P2) via a crease line (CLFP2), wherein the crease line (CLFP2) is parallel to the crease line (CLP2), and a flap (F) which is hinged to the fourth side panel (S4) via a crease line (CLF), wherein the crease line (CLF) is parallel to the third crease line (CL3), and wherein the first side panel (S1) comprises a half-cut line (C), and wherein the folding carton blank further comprises an outer layer (OL), an inner layer (IL), wherein the inner layer (IL) comprises information for using the cosmetic composition, and at least one middle layer (ML) which is located between the outer layer (OL) and the inner layer (IL), wherein the half-cut line (C) pierces the inner layer (IL) completely and optionally the at least one middle layer (ML) at least partially, and wherein the flap (F) comprises a glue area (G), wherein on the glue area (G) glue can be applied and wherein the glue area (G) is located on the outer layer (OL) of the flap (F), and wherein the outer layer (OL) of the flap (F) can be fixed to the inner layer (IL) of the first side panel (S1) so that the half-cut line (C) surrounds the glue area (G) at least partially and the glue area (G) does not touch the half-cut line (C).

2. Folding carton blank for packaging cosmetic compositions according to claim 1, wherein the folding carton blank has an overall thickness (T) in the range from 383 to 631 μm, determined according to TAPPI 411.

3. Folding carton blank for packaging cosmetic compositions according to claim 1, wherein the inner layer (IL)

iii) comprises bleached chemical pulp, and/or iv) is single-coated, wherein the inner layer (IL) has a thickness in the range from 57 to 95 μm and the single-coating has a thickness in the range from 38 to 63 μm.

4. Folding carton blank for packaging cosmetic compositions according to claim 1, wherein the outer layer (OL)

iii) is double-coated, wherein the outer layer (OL) has a thickness in the range from 77 to 126 μm and the double-coating has a thickness in the range from 57 to 95 μm, and/or iv) comprises bleached chemical pulp.

5. Folding carton blank for packaging cosmetic compositions according to claim 1, wherein the at least one middle layer (ML)

i) comprises bleached thermomechanical pulp (BTMP) and mill broke, and/or ii) has a thickness in the range from 154 to 252 μm.

6. Folding carton blank for packaging cosmetic compositions according to claim 1, wherein the crease line (CLF) and the glue area (G) have a distance of iii) at least 2.8 mm, preferably of at least 2.9 mm, more preferably of at least 3 mm, and especially preferably of at least 3.1 mm, and/or iv) at most 3.6 mm, preferably of at most 3.5 mm, more preferably of at most 3.4 mm, and especially preferably of at most 3.3 mm.

7. Folding carton blank for packaging cosmetic compositions according to claim 1, wherein the half-cut line (C) has a depth i) of at most 60% of the overall thickness (T) of the folding carton blank, and/or ii) in the range from 95 to 377 μm.

8. Folding carton blank for packaging cosmetic compositions according to claim 1, wherein the folding carton blank further comprises two additional flaps (F1A, F1B) and two additional flaps (F3A, F3B), wherein the flap (F1A) is hinged to the first side panel (S1) via a crease line (CLF1A) and the flap (F1B) is hinged to the first side panel (S1) via a crease line (CLF1B), wherein the crease lines (CLF1A, CLF1B) are parallel to each other and at a right angle to the first crease line (CL1), and wherein the flap (F3A) is hinged to the third side panel (S3) via a crease line (CLF3A) and the flap (F3B) is hinged to the third side panel (S3) via a crease line (CLF3B), wherein the crease lines (CLF3A, CLF3B) are parallel to each other and at a right angle to the second and third crease line (CL2, CL3), and wherein the flaps (F1A, F1B) comprise arrows, wherein the arrows are printed on the outer layer (OL) and/or on the inner layer (IL).

9. A method for the preparation of at least one folding carton blank for packaging cosmetic compositions according to claim 1, wherein the method comprises the steps:

b) providing a pre-blank of the at least one folding carton blank, wherein the pre-blank is an unprinted flat carton sheet, wherein the unprinted flat carton sheet comprises an outer layer (OL), an inner layer (IL), and at least one middle layer (ML) which is located between the outer layer (OL)

and the inner layer (IL), and wherein the unprinted flat carton sheet has dimensions that allow at least one folding carton blank to be die-cut, c) imprinting the pre-blank of the at least one folding carton blank, so that the inner layer (IL) of the at least one carton blank comprises information for using the cosmetic composition, and d) treating the imprinted pre-blank obtained in step b) simultaneously with a cutting machine and a grooving device to obtain the at least one folding carton blank for packaging cosmetic compositions, wherein the treatment with the cutting machine is carried out to die-cut the at least one folding carton-blank and to obtain the half-cut line (C), and the treatment with the grooving device is carried out to obtain the crease lines (CL1, CL2, CL3, CLF, CLP1, CLP2, CLFP1, CLFP2).

10. A method for the preparation of a folding carton for packaging cosmetic compositions, wherein the method comprises the steps:

g) providing a folding carton blank according to claim 1, h) applying a glue on the glue area (G), i) folding the folding carton blank along the crease lines (CL2, CLF), j) fixing the outer layer (OL) of the flap (F) to the inner layer (IL) of the first side panel (S1) by pressing, so that the half-cut line (C) surrounds the glue area (G) at least partially and the glue area (G) does not touch the half-cut line (C), k) unfolding the folding carton blank along the first and third crease lines (CL1, CL3) to obtain a rectangular mould closed at the sides, wherein the inner layer (IL) is inside the rectangular mould and the outer layer (OL) is outside the rectangular mould, and l) Close the rectangular mould obtained in step e) by folding the crease lines (CLP1, CLP2, CLFP1, CLFP2) to obtain the folding carton.

11. A folding carton for packaging cosmetic compositions obtained by a process according to claim 10.

12. A folding carton for packaging cosmetic compositions according to claim 11, wherein the folding carton has a height (H) in the range from 8 to 24 cm, a width (W) in the range from 4 to 14 cm and a length (L) in the range from 3 to 9 cm.

13. The use of the folding carton according to claim 11 for packaging cosmetic compositions, preferably for packaging cosmetic hair compositions, more preferably for packaging retail cosmetic hair compositions.

* * * * *